(12) United States Patent  
Ezumi

(10) Patent No.: US 7,197,329 B2  
(45) Date of Patent: Mar. 27, 2007

(54) WIRELESS COMMUNICATION APPARATUS, CORDLESS TELEPHONE, DISPLAY OPERATION CONTROL METHOD, PROGRAM, AND STORAGE MEDIUM

(75) Inventor: Yosuke Ezumi, Ibaraki (JP)

(73) Assignee: Canon Kabushiki Kaisha (JP)

( * ) Notice: Subject to any disclaimer, the term of this patent is extended or adjusted under 35 U.S.C. 154(b) by 797 days.

(21) Appl. No.: 10/397,045

(22) Filed: Mar. 25, 2003

(65) Prior Publication Data

US 2003/0228882 A1 Dec. 11, 2003

(30) Foreign Application Priority Data

Mar. 25, 2002 (JP) .............................. 2002-083579
Mar. 25, 2003 (JP) .............................. 2003-082482

(51) Int. Cl.
*H04M 1/00* (2006.01)

(52) U.S. Cl. .................. 455/550.1; 455/566; 455/310; 455/63.1; 348/14.02; 348/14.03; 348/14.14; 345/1.2; 345/2.3; 345/5

(58) Field of Classification Search ............ 455/550.1, 455/566, 310, 63.1; 348/14.02, 14.03, 14.14; 345/1.2, 2.3, 5

See application file for complete search history.

(56) References Cited

U.S. PATENT DOCUMENTS 6,381,476 B1 * 4/2002 Yoshida ...................... 455/566

FOREIGN PATENT DOCUMENTS

| JP | 4-167750 | | 6/1992 |
|---|---|---|---|
| JP | 5-218964 | A | 8/1993 |
| JP | 7-336520 | | 12/1995 |
| JP | 8-265854 | A | 10/1996 |
| JP | 8-293839 | | 11/1996 |
| JP | 8-340370 | | 12/1996 |
| JP | 10-23545 | A | 1/1998 |
| JP | 10-200426 | | 7/1998 |
| JP | 11-127300 | | 5/1999 |
| JP | 2000-200095 | A | 7/2000 |
| JP | 2000-353036 | A | 12/2000 |
| JP | 2001-332994 | | 11/2001 |
| JP | 2002-55667 | A | 2/2002 |

OTHER PUBLICATIONS

Written Argument in response to Japanese Office Action of corresponding Japanese Application 2003-82482.

* cited by examiner

*Primary Examiner*—Quynh H. Nguyen
(74) *Attorney, Agent, or Firm*—Rossi, Kimms & McDowell LLP

(57) ABSTRACT

There is provided a wireless communication apparatus, which is capable of suppressing a burst noise emitted due to data transfer during wireless communication, thereby enhancing communication quality. The wireless communication apparatus transmits and receives a speech signal using a radio wave. Data to be displayed on the display screen is stored in a storage device. The stored data is transferred to the display device. Data displayed on the display screen of the display device is periodically updated based on the transferred data. A CPU monitors a wireless communication state of the wireless communication apparatus and stops the data transfer based on the monitored wireless communication state.

18 Claims, 6 Drawing Sheets

FIG. 1
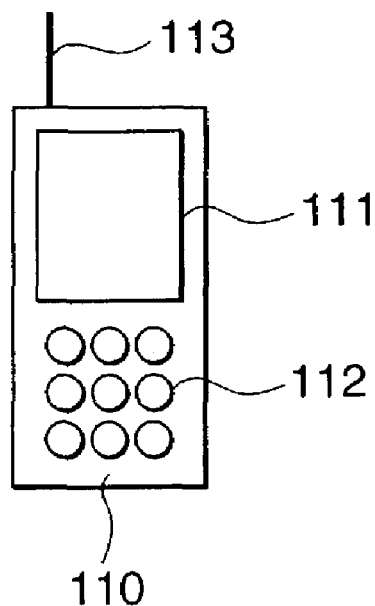
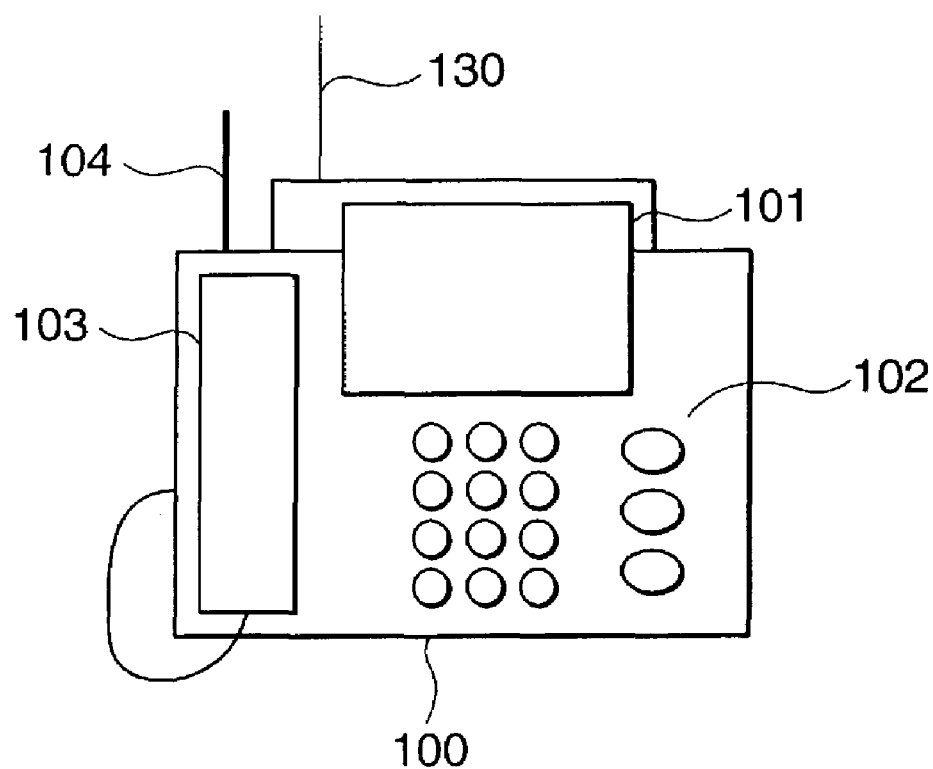

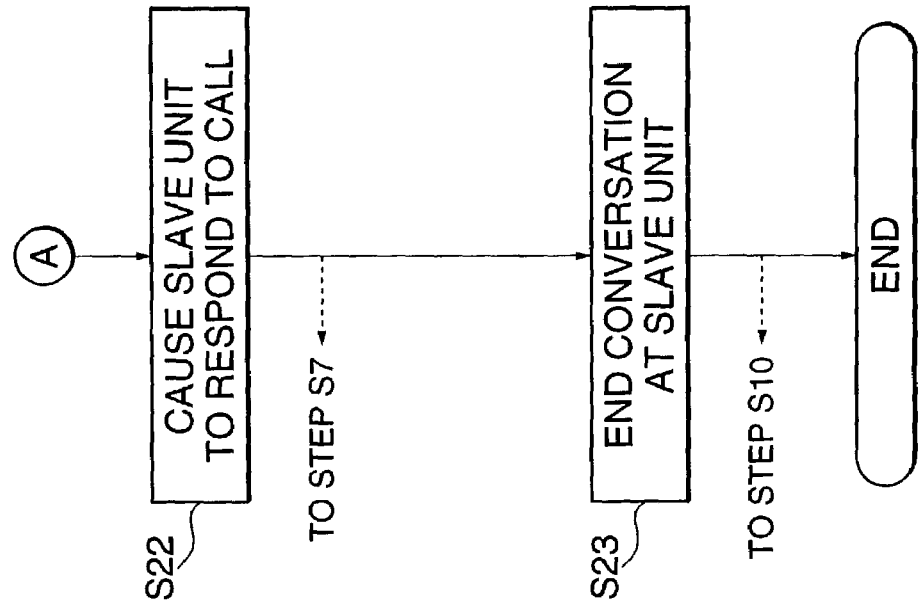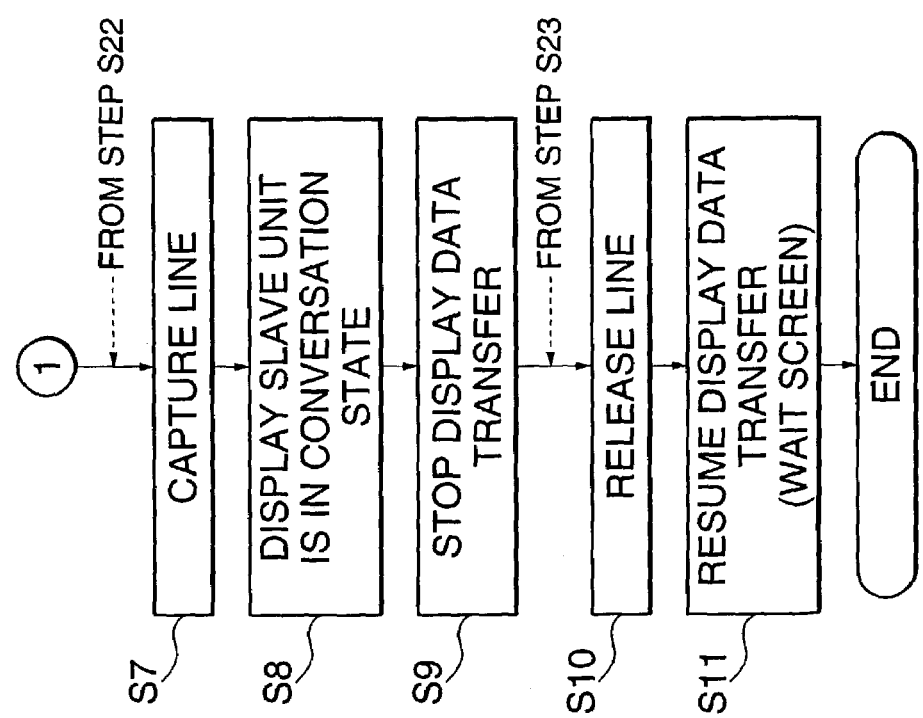

WIRELESS COMMUNICATION APPARATUS, CORDLESS TELEPHONE, DISPLAY OPERATION CONTROL METHOD, PROGRAM, AND STORAGE MEDIUM

BACKGROUND OF THE INVENTION

1. Field of the Invention

The present invention relates to a wireless communication apparatus, a cordless telephone, a display operation control method, a program, and a storage medium. In particular, the present invention relates to a wireless communication apparatus and a cordless telephone, which are comprised of a slave unit and a master unit, with which the slave unit located remotely from the master unit performs conversation with an opposite party by using a wireless radio wave through the master unit connected to a telephone line, a display operation control method, a program for implementing the method, and a storage medium storing the program.

2. Description of the Related Art

A conventional wireless communication apparatus such as a cordless telephone has a function called "carrier sense" of detecting in advance whether the frequency of each conversation channel is being used, when starting communication using the communication apparatus, and selecting a vacant channel that is not currently used while avoiding other channels that are currently used by other cordless telephones, to thereby guarantee a normal communication operation.

Even if conversation is started using the channel selected by the above carrier sense function or carrier sense, if a noise that has such a low level as is not detected by the carrier sense function occurs and in particular the noise has burst-like regularity, the noise acts as an annoyance for the conversation, resulting in degraded conversation quality. Such a noise does not raise a serious problem with monochrome displaying using a small-sized display, because the amount of data transferred to the display is small. Therefore, the occurrence of noise during conversion using a wireless communication apparatus has conventionally been suppressed by the following prior art methods.

Japanese Laid-Open Patent Publication (Kokai) No. 2001-332994 discloses a small-sized wireless apparatus as represented by a cellular phone, in which to suppress a noise generated from a logic circuit in a receiving section of the wireless apparatus, the power supply is stopped to a data conversion section, an LCD driver input/output control section, and the like that are not directly related to a receiving operation.

Japanese Laid-Open Patent Publication (Kokai) No. 07-336520 discloses a facsimile machine having a cordless telephone, in which to prevent occurrence of a noise from a facsimile section whose operation clock has a high frequency, control is provided such that a CPU of the facsimile section is set in a non-operating mode when no facsimile operation is carried out.

Japanese Laid-Open Patent Publication (Kokai) No. 08-293839 discloses a cordless telephone equipped with a facsimile, in which to prevent the intrusion of a noise from the facsimile system into the cordless telephone system, a CPU that controls the facsimile reception is put into a halt state when facsimile transmission/reception is not carried out.

Further, Japanese Laid-Open Patent Publication (Kokai) No. 11-127300 discloses a facsimile machine having a cordless telephone, in which oscillation of an IC that is a source of a radiant noise is stopped in advance in order to prevent the noise from interfering with the operation of a control channel of the cordless telephone. To this end, the supply of a clock to a logic IC of an image processor is stopped when the facsimile machine is on standby, and further, the cordless telephone is inhibited from being used during a copy operation and copying is inhibited from being carried out when the control channel of the cordless telephone is used for phone conversion.

In recent years, however, with advancement of information and communication technology in the field of wireless communication apparatuses (cordless telephones, for example), communication carriers and the like have launched new services for browsing information using fixed-line phones. With such surfaces, phone displays have developed from monochrome display to color display, which has led to an increased amount of data transferred to the displays, and as a result, the above noise problem has become more serious. That is, the performance of wireless communication apparatuses (cordless telephones, for example) has been enhanced so that the amount of data required for displays has increased to several tens as large as the previously required amount. In addition, the data transfer speed has further increased and hence the data amount has increased, which results in burst-like noise occurring during wireless communication.

Also, the displays have become capable of carrying out color displaying to cope with wait screens and moving screens such as a screen saver, so that burst-like data is periodically transferred via system buses.

SUMMARY OF THE INVENTION

It is an object of the present invention to provide a wireless communication apparatus, which is capable of suppressing a burst noise emitted due to data transfer during wireless communication, thereby enhancing communication quality, a cordless telephone, which is capable of suppressing a burst noise emitted due to data transfer on a master unit side thereof, thereby enhancing conversation quality, a display operation control method which has solved the above described problems, a program for implementing the method, and a storage medium storing the program.

To attain the above object, in a first aspect of the present invention, there is provided a wireless communication apparatus that transmits and receives a speech signal using a radio wave, comprising a display device having a display screen, a storage device that stores data to be displayed on the display screen, a transfer device that transfers the stored data, a display control device that periodically updates data displayed on the display screen of the display device based on the transferred data, and a control device that monitors a wireless communication state of the wireless communication apparatus and stops the data transfer by the transfer device based on the monitored wireless communication state.

To attain the above object, in a second aspect of the present invention, there is provided a cordless telephone comprising a master unit having a display screen, at least one slave unit, a speech signal being transmitted and received between the master unit and the slave unit using a radio wave, a storage device that stores data to be displayed on the display screen of the master unit, a transfer device that transfers the stored data, a display control device that periodically updates data displayed on the display screen of the master unit based on the transferred data, and a control device that monitors a state of wireless communication between the master unit and the slave unit and stops the data transfer by the transfer device based on the monitored wireless communication state.

Preferably, the control device is responsive to start of conversion using the slave unit, for stopping transfer of various types of data including the data to be displayed.

Preferably, the control device stops the data transfer by the transfer device upon lapse of a predetermined delay time after the wireless communication state changes to a conversation state.

Preferably, the display control device is responsive to start of conversion using the slave unit, for updating data displayed on the display screen of the display device displayed by the master unit such that the display screen is switched from a display showing that the slave unit is receiving an incoming call to a display showing that the slave unit is busy, and wherein the control device is responsive to start of conversion using the slave unit, for stopping the data transfer by the transfer device, and is responsive to the conversion using the slave unit being ended, for resuming the data transfer.

To attain the above object, in a third aspect of the present invention, there is provided a method of controlling display operation of a wireless communication apparatus that transmits and receives a speech signal using a radio wave, comprising the steps of storing data to be displayed on a display screen of the wireless communication apparatus, transferring the stored data, periodically updating data displayed on the display screen of the wireless communication apparatus based on the transferred data, and monitoring a wireless communication state of the wireless communication apparatus and controlling stoppage and resumption of the data transfer based on the monitored wireless communication state.

To attain the above object, in a fourth aspect of the present invention, there is provided a method of controlling display operation of a cordless telephone that transmits and receives a speech signal using a radio wave between a master unit and a slave unit thereof, comprising a storage step of storing data to be displayed on a display screen of the master unit, a transfer step of transferring the stored data, a display control step of periodically updating data displayed on the display screen of the master unit based on the transferred data, and a control step of monitoring a wireless communication state between the master unit and the slave unit and controlling stoppage and resumption of the data transfer based on the monitored wireless communication state.

Preferably, the control step comprises stopping transfer of various types of data including the data to be displayed, in response to start of conversation using the slave unit.

Preferably, the control step comprises stopping the data transfer in the transfer step upon lapse of a predetermined delay time after the wireless communication state changes to a conversation state.

Preferably, the display control step comprises updating data displayed on the display screen of the display device displayed by the master unit such that the display screen is switched from a display showing that the slave unit is receiving an incoming call to a display showing that the slave unit is busy, in response to start of conversion using the slave unit, and wherein the control step comprises stopping the data transfer by the transfer device in response to start of conversion using the slave unit, and resuming the data transfer in response to the conversion using the slave unit being ended.

To attain the above object, in a fifth aspect of the present invention, there is provided a wireless communication apparatus that transmits and receives a speech signal using a radio wave, comprising a display device having a display screen, an expanding device that expands data to be displayed on the display screen, a transfer device that transfers the expanded data, a display control device that updates data displayed on the display screen based on the transferred data, a monitoring device that monitors a wireless communication state of the wireless communication apparatus, and a stopping device that stops the data transfer, wherein when the wireless communication apparatus is in the wireless communication state, the stopping device stops the data transfer by the transfer device and the display control device causes the display device to continue displaying based on data that has been already transferred.

Preferably, the expanding device expands the data to be displayed on the display screen based on state information indicative of the wireless communication state monitored by the monitoring device, and wherein when the wireless communication apparatus is in the wireless communication state, the display control device causes the display device to carry out displaying based on the state information which has been updated, and thereafter the stopping device stops the data transfer by the transfer device.

Preferably, the monitoring device monitors states of the wireless communication apparatus including the wireless communication state, wherein the expanding device expands the data to be displayed on the display screen based on state information indicative of the wireless communication state of the wireless communication apparatus monitored by the monitoring device, and wherein when the wireless communication apparatus is in the wireless communication state, the display control device causes the display device to carry out displaying based on the state information which has been updated, and thereafter the stopping device stops the data transfer by the transfer device.

Preferably, the wireless communication apparatus is a cordless telephone comprising a master unit, and at least one slave unit, and wherein the speech signal is transmitted and received using the radio wave between the master unit and the slave unit.

More preferably, the wireless communication state is a state where conversation using the master unit and the slave unit is being carried out.

To attain the above object, in a sixth aspect of the present invention, there is provided a method of controlling display operation of a wireless communication apparatus that transmits and receives a speech signal using a radio wave, comprising an expanding step of expanding data to be displayed on a display screen of the wireless communication apparatus, a transfer step of transferring the expanded data, a display control step of updating data displayed on the display screen based on the transferred data, a monitoring step of monitoring a wireless communication state of the wireless communication apparatus, and a stopping step of stopping the data transfer, wherein when the wireless communication apparatus is in the wireless communication state, the data transfer is stopped in the stopping step and displaying is continued based on data that has been already transferred in the display control step.

Preferably, the expanding step comprises expanding data to be displayed on the display screen based on state information indicative of the wireless communication state monitored in the monitoring step, and when the wireless communication apparatus is in the wireless communication state, displaying is carried out based on the state information which has been updated in the display control step, and thereafter the data transfer is stopped in the stopping step.

Preferably, the monitoring step comprises monitoring states of the wireless communication apparatus including the wireless communication state, wherein the expanding step comprises expanding data to be displayed on the display screen based on state information indicative of the wireless communication state monitored in the monitoring step, and wherein when the wireless communication apparatus is in the wireless communication state, displaying is carried out based on the state information which has been updated in the display control step, and thereafter the data transfer is stopped in the stopping step.

Preferably, the wireless communication apparatus is a cordless telephone comprising a master unit, and at least one slave unit, and wherein the speech signal is transmitted and received using the radio wave between the master unit and the slave unit.

More preferably, the wireless communication state is a state where conversation using the master unit and the slave unit is being carried out.

To attain the above object, the present invention further provides a computer-readable program for implementing the display operation control method according to any of the third, fourth and sixth aspects.

According to the present invention, it is possible to suppress a burst noise emitted due to data transfer during wireless communication by the wireless communication apparatus, thereby enhancing the communication quality. Also, during phone conversation using the cordless telephone, it is possible to suppress a burst noise emitted due to data transfer on the master unit side, thereby enhancing the conversation quality. That is, only while the slave unit is in a conversation state, the data transfer is stopped. As a result, it is possible to suppress a burst noise emitted due to data transfer.

Also, even if the state of the apparatus changes, it is possible to continue the display while suppressing a burst noise emitted due to data transfer to the display device. This provides an excellent effect that the user can easily grasp the current state of the apparatus without difficulty.

Also, the present invention provides an excellent effect that even if the state of the apparatus changes, the up-to-date state of the apparatus can be displayed while suppressing a burst noise emitted due to data transfer to the display device.

Also, the operative state (status) of the apparatus, for example, is monitored to stop transfer of various types of data and control can be provided in response to change in the operative state. Further, to prevent the phenomenon that the display screen is not switched when the data transfer is stopped simultaneously with a change in the operative state, for example, the phenomenon that the display screen continues to show that the slave unit is ringing even after the slave unit enters a conversion state, display switching control is provided to switch the display screen with a predetermined delay time. As a result, it becomes possible to satisfy all requirements.

Also, the display operation control method according to the present invention can be implemented by software, which can dispense with hardware measures such as shielding the substrate, filtering, or changing the frequencies to prevent interference.

The above and other objects, features, and advantages of the invention will become more apparent from the following detailed description taken in conjunction with the accompanying drawings.

BRIEF DESCRIPTION OF THE DRAWINGS

FIG. 1 is a view showing the configuration of a facsimile machine (FAX) equipped with a cordless telephone as a wireless communication apparatus according to an embodiment of the present invention;

FIGS. 4A and 4B are flowcharts showing an operation process carried out by the master unit 100 and the slave unit 110 when phone conversation using the slave unit 110 is being carried out, showing processing from stoppage of transfer of display data to the process returning to a standby state after the conversation is ended, in which:

FIG. 4A shows processing carried out on the master unit 100 side; and

FIG. 4B shows processing carried out on the slave unit 110 side;

FIGS. 5A and 5B are flowcharts showing continued parts of the operation process in FIGS. 4A and 4B, which are carried out by the master unit 100 and the slave unit 110 when phone conversation using the slave unit 110 is being carried out, showing processing from the stoppage of the display data transfer to the process returning to the standby state after the conversation is ended, in which:

FIG. 5A shows processing carried out on the master unit side; and

FIG. 5B shows processing carried out on the slave unit 110 side; and

FIGS. 6A and 6B are timing charts showing a relation between data transfer via a system bus 215 and noise occurring during phone conversation, in which:

FIG. 6A shows a case where the data transfer via the system bus 215 is carried out; and FIG. 6B shows a case where the data transfer via the system bus 215 is stopped.

DETAILED DESCRIPTION OF THE PREFERRED EMBODIMENTS

Figure 2:
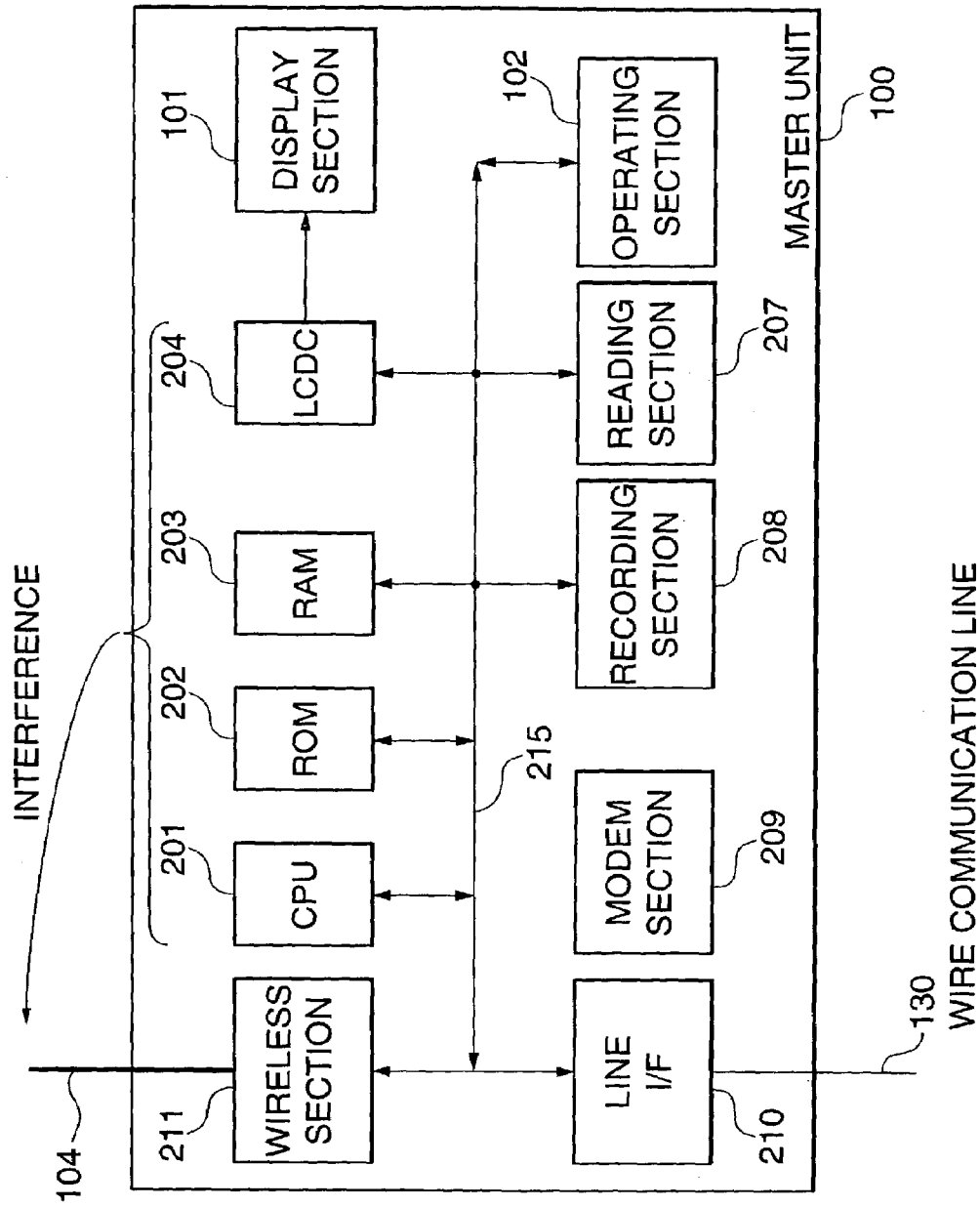
FIG. 2 is a block diagram showing the internal construction of a master unit 100 appearing in FIG. 1.

The present invention will now be described in detail with reference to the drawings showing a preferred embodiment thereof. FIG. 1 shows the configuration of a facsimile machine (FAX) equipped with a cordless telephone as a wireless communication apparatus according to the present embodiment. In FIG. 1, reference numeral 100 denotes the facsimile machine (master unit of the cordless telephone) according to the present embodiment, and reference numeral 110 denotes a slave unit of the cordless telephone.

The master unit 100 includes a display section 101, an operating section 102, a handset 103, and a master unit antenna 104, and is connected to a public line via a wire communication line 130. The master unit antenna 104 is used for wireless communication through the slave unit 110. The display section 101 is comprised of a color LCD. On the other hand, the slave unit 110 of the cordless telephone includes a display 111, an operating section 112, and a slave unit antenna 113. The slave unit antenna 113 is used for wireless communication with the master unit 100.

FIG. 2 is a block diagram showing the internal construction of the master unit 100. The master unit 100 performs control of the main body of the facsimile machine, communication line control, control of wireless communication with the slave unit 110, and the like, and is comprised of a CPU 201, a ROM 202, a RAM 203, an LCD controller 204, the display device section (display section) 101 such as a color LCD, the operating section 102, a reading section 207, a recording section 208, a modem section 209, a communication line interface (I/F) 210, a wireless communication section 211, a system bus 215, and the master unit antenna 104. The CPU 201 has incorporated therein a DMA controller for carrying out DMA transfer from the RAM 203 to the LCD controller 204.

The ROM 202 stores a system program and display data. The RAM 203 provides a work area for operation, a work area for a display screen, and an area for backup data. The wireless communication section 211 communicates with the slave unit 110 of the cordless telephone. Also, the CPU operates in accordance with the program in the ROM 202 to monitor a wireless communication state, that is, determine whether the master unit 100 and the slave unit 110 are currently carrying out wireless communication, monitor the states of the recording section 208, the reading section 207, and the like to check the presence of a recording sheet, the presence of an original, the presence of a paper jam, the presence of ink in the recording section 208, and the like.

Figure 3:
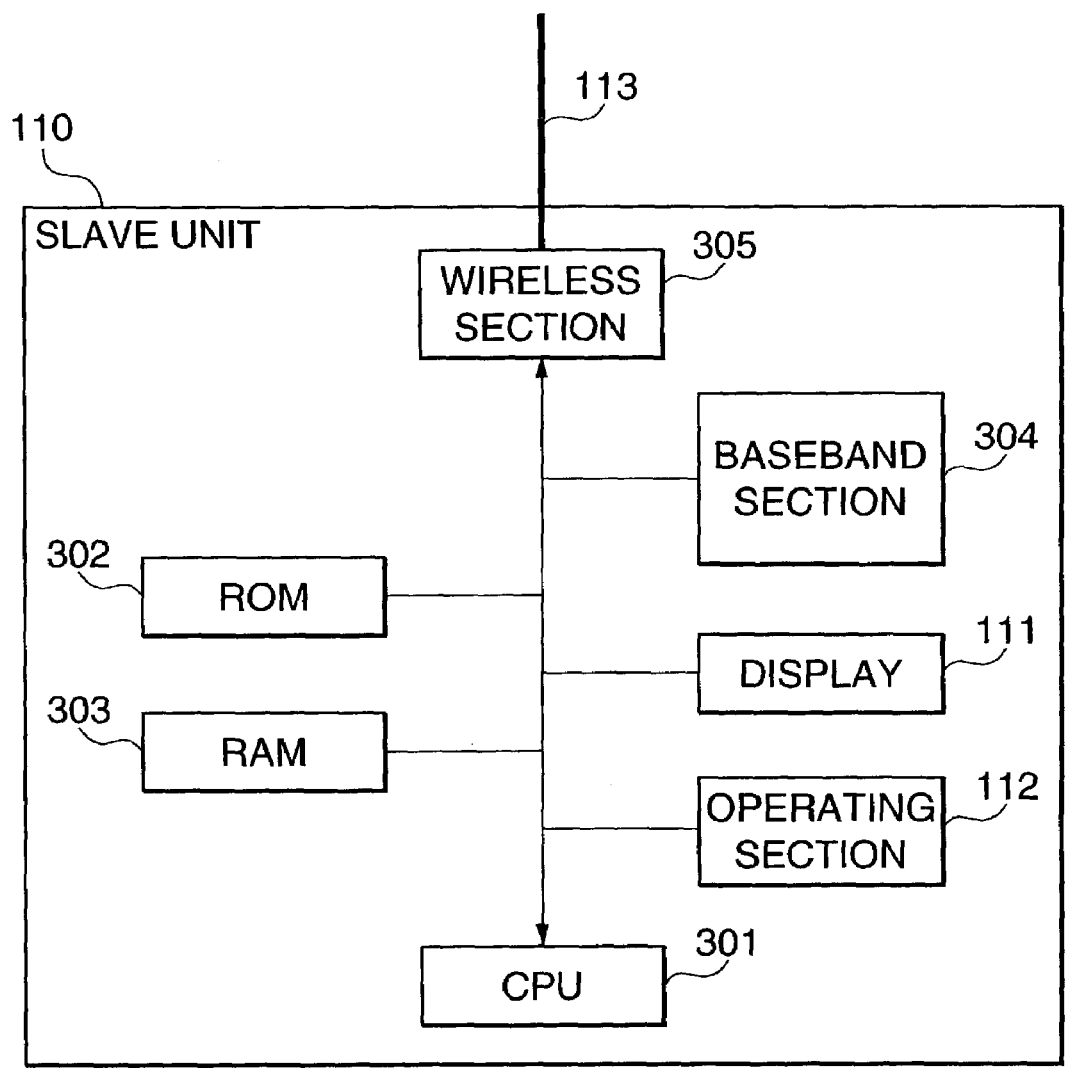
FIG. 3 is a block diagram showing the internal construction of a slave unit 110 appearing in FIG. 1.

FIG. 3 is a block diagram showing the internal construction of the slave unit 110. The slave unit 110 is comprised of a CPU 301, a ROM 302, a RAM 303, a baseband section 304 that performs speech processing, a wireless section 305 that performs modulation/demodulation, the slave unit antenna 113, the display 111, and the operating section 112.

Next, a description will be given of a display operation process carried out by the master unit 100 constructed as described above. This display operation process is for displaying on the screen of the display section 101 contents (presence of a recording sheet, presence of an original, occurrence of jamming, presence of ink in the recording section 208, etc.) to be checked by monitoring the aforementioned states (the state of wireless communication between the master unit 100 and the slave unit 110, the states of the recording section 208, reading section 207 and others, etc.) by the CPU 201.

The ROM 202 stores in advance data used to display these contents on the screen of the display section 101. Specifically, the ROM 202 stores data used to display "no paper" on the screen of the display section 101 when sheets have been exhausted, and data used to display "the slave unit is busy" on the screen of the display section 101 when the slave unit 110 enters a conversion state.

The display data is transferred from the ROM 202 to the RAM 203 (video RAM) through block transfer using the system bus 215 and is expanded as graphic data onto the RAM 203. The RAM 203 is composed of an SDRAM. The data, which is an assembled set of data for one display screen, is transferred from the RAM 203 to the LCD controller 204 through DMA transfer. The data transferred to the LCD controller 204 is further transferred to the display section 101 to carry out drawing on the display section 101. The above operation is repeated periodically to realize screens such as a moving wait screen and a screen saver. All screens to be displayed on the display section 101 are displayed in the same manner as mentioned above.

Figure 4B:
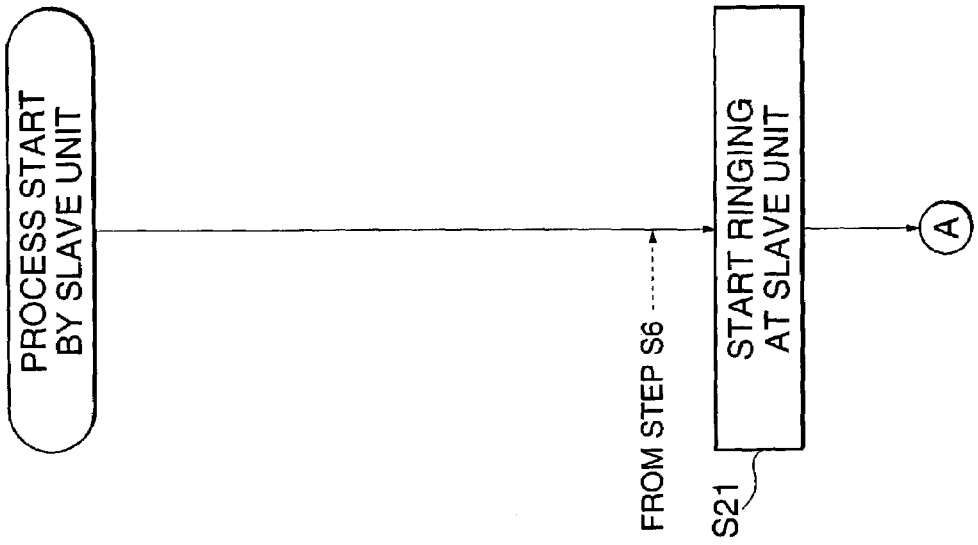
Figure 4A:
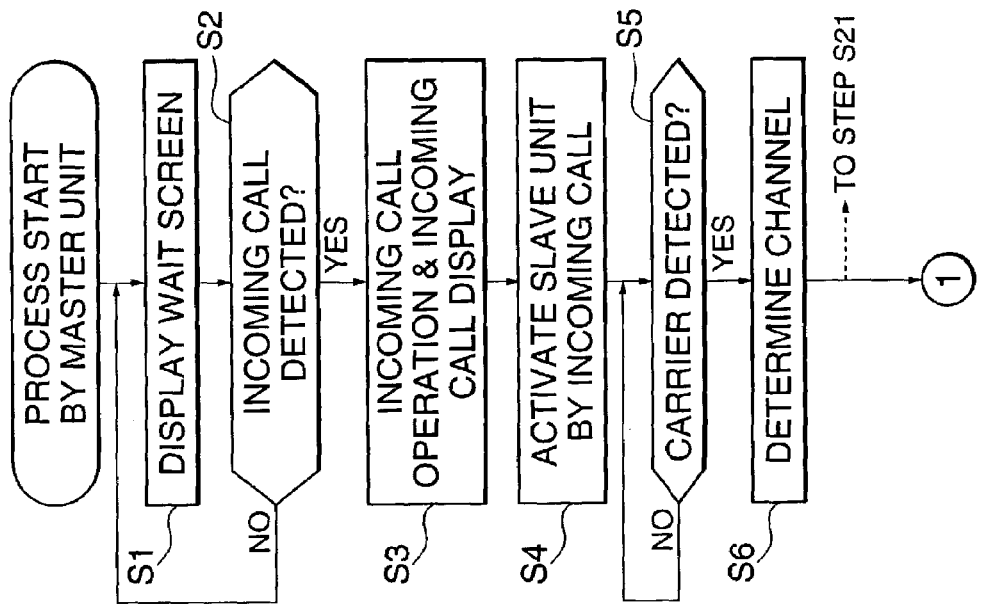

FIGS. 4A and 4B and FIGS. 5A and 5B are flowcharts showing an operation process carried out by the master unit 100 and the slave unit 110 when conversation using the slave unit 110 is being carried out. The flowcharts show processing from stoppage of transfer of display data to the process returning to a standby state after the conversation is ended. FIGS. 4A and 5A show processing carried out on the master unit 100 side, while FIGS. 4B and 5B show processing carried out on the slave unit 110 side. Programs that realize the present operation process are stored in the ROM 202 of the master unit 100 and the ROM 302 of the slave unit 110 and are executed by the CPUs 201, 301, respectively. First, it is assumed that the master unit 100 is in a standby state. Then, a wait screen is displayed on the display section 101 of the master unit 100 (step S1). As an example of the wait screen, the state of the recording section 208 or the reading section 207 may be displayed. In the wait screen displaying process, the display data for the wait screen is read out from the ROM 202, transferred from the ROM 202 to the video RAM 203 through block transfer using the system bus 215, and expanded as graphic data onto the video RAM 203, as described above. Then, items of the display data are assembled into data for one screen as the wait screen, and transferred to the LCD controller 204 through the next DMA transfer. The data transferred to the LCD controller 204 is further transferred to the display section 101 for drawing and displayed by the display section 101.

Then, it is determined whether an incoming call has been detected (step S2). If there is no incoming call, the process returns to the step S1. On the other hand, if there is an incoming call, an incoming call operation and an incoming call displaying operation are carried out at the same time (step S3). In the present embodiment, upon detection of an incoming call, an incoming call ringing or the like is detected and display of the incoming call is carried out. This incoming call display process is carried out in the same manner as the wait screen display process described above.

Then, the slave unit 110 is activated by the incoming call (step S4). According to an incoming call connection request from the master unit 100 to the slave unit 110, channel search is started. Specifically, carrier detection is carried out by the wireless communication section 211 to detect whether or not another cordless telephone is currently being used, and if the detection result is affirmative, further detect whether or not an interfering wave exists within the band of the channel being used by the other cordless telephone (step S5). Then, after a carrier is detected, a usable channel is determined (step S6).

On the other hand, when receiving information on the usable channel from the master unit 100, the slave unit 110 also carries out carrier detection and interference wave detection. If there is a channel that can be used by the slave unit 110, the slave unit 110 is caused to start ringing (step S21). If the slave unit 110 responds to the incoming call (step S22), the master unit 100 captures the line (step S7), a conversation path is formed between the master unit 100 and the slave unit 110, and the slave unit 110 enters a conversation state.

The master unit 100 changes the screen on the display section 101 to a display screen showing that the slave unit is in a conversation state (step S8). Specifically, the display screen is switched by the same method as used to display the wait screen described above. If the display operation is continued, that is, if the DMA transfer of the graphic data from the RAM 203 to the LCD controller 204 is continued, a noise that has a level too low to be detected by carrier sense occurs even if the slave unit 110 enters a conversation state. The noise forms an annoyance during conversation and is recognized by the user. The noise is generated on the system bus 215 in synchronism with timing in which the display data is transferred to the LCD controller 204. Here, the noise generated on the system bus 215 is emitted via the entire system bus 215 and therefore exerts a greatly adverse influence on a wireless device such as the slave unit 110.

To solve this problem, the display method is changed only during conversation using the slave unit 110 (step S9). More specifically, in the display process, as described above, graphic data to be displayed during the conversation using the slave unit 110 is transferred from the ROM 202 to the video RAM 203 through block transfer, expanded onto the video RAM 203, further transferred to the LCD controller 204 through DMA transfer, and the data transferred to the LCD controller 204 is further transferred to the display section 101 for drawing. In the step S9, the display data transfer timing is delayed by a predetermined time period in synchronism with the change in the status, i. e., the shifting to the conversation using the slave unit 110, and then the transfer of the display data is stopped. Accordingly, the block transfer from the ROM 202 to the RAM 203 is stopped and the DMA transfer from the RAM 203 to the LCD controller 204 is also stopped. As a result, burst-like data transfer, which otherwise periodically takes place on the system bus 215, ceases to take place so that no noise is generated from the system bus 215. On the other hand, the LCD controller 204 includes a memory that accumulates the transferred data and the data transfer is carried out via a dedicated bus from the LCD controller 204 to the LCD (display section) 101, so that displaying is continued. The influence exerted by only the transfer of display data using the dedicated bus from the LCD controller 204 to the LCD 101 on a wireless device, such as the slave unit 110, is small. The first reason for this is that the transfer distance is short in the transfer using the dedicated bus between the LCD controller 204 and the LCD 101 and therefore the noise emission area is very narrow compared with the transfer using the system bus. The second reason is that even if a noise occurs that exerts an influence on a wireless device such as the slave unit 110, the dedicated bus between the LCD controller 204 and the LCD 101 is usually formed by a cable, and therefore the noise occurrence can be easily coped with by merely using a noise canceling component part such as a core. The third reason is that the data transfer between the LCD controller 204 and the LCD 101 is usually not so fast as the transfer via the system bus, and therefore a large timing delay margin is allowed and hence the influence can be eliminated by taking measures to make the noise waveform blunt. Further, if the data transfer is stopped simultaneously upon the status change, i.e., the shifting to conversation using the slave unit 110, there is a fear that the display screen is not switched. Therefore, as described above, to prevent the display screen showing that the slave unit is ringing from being continuously displayed even after the slave unit 110 enters a conversation state, control is provided such that the display data transfer is stopped with a delay of a predetermined time period, that is, the display screen showing "the slave unit is ringing" is switched to a display screen showing "the slave unit is busy" before the display data transfer is stopped. By thus stopping the display data transfer after a delay of a predetermined time period (that is, after the display screen showing "the slave unit is ringing" is switched to a display screen showing "the slave unit is busy", it is possible to reliably switch from the display screen showing "the slave unit is ringing" nto the display screen showing "the slave unit is busy". Also, in the present embodiment, prior to stopping the transfer of display data in the step S9 in FIG. 5A (that is, prior to stopping the transfer of the display data from the RAM 203 to the LCD controller 204), the process for displaying the conversation state of the slave unit is carried out in step S8. Due to this process, a delay is surely obtained to ensure the switching of the display screen with reliability, thus informing the user of the up-to-date state of the apparatus. Although in the present embodiment, the transfer of display data is stopped after the switching to the display screen showing "nthe slave unit is busy", the present invention is not limited to such displaying of the conversation state of the slave unit 110. Alternatively, the transfer of display data may be stopped after the up-to-date state of the apparatus after some change, for example, ("automatic-answering telephone is operating", "no paper", "no ink", for example), is reflected upon the display screen. Further, although in the step S8, the transfer of display date is stopped after the displaying of the conversation state of the slave unit, the present invention is not limited to this, but a certain delay time period that is sufficient for switching the display screen showing "slave unit is ringing" nto the display screen showing "the slave unit is busy" nmay be counted. and the data transfer may be stopped when the counted delay time period has elapsed.

Referring again to FIGS. 5A and 5B, since the display screen should remain unchanged during the conversation using the slave unit 110, the current display screen is continuously displayed. When the conversation using the slave unit 110 is ended (step S23), the master unit 100 releases the line (step S10). Then, the apparatus returns to the standby state, the display data to be displayed is returned to data to be displayed by an ordinary display method, and an ordinary wait screen is displayed (step S11). Thereafter, the present display operation process carried out by both the slave unit 110 and the master unit 100 is terminated.

Figure 6A:
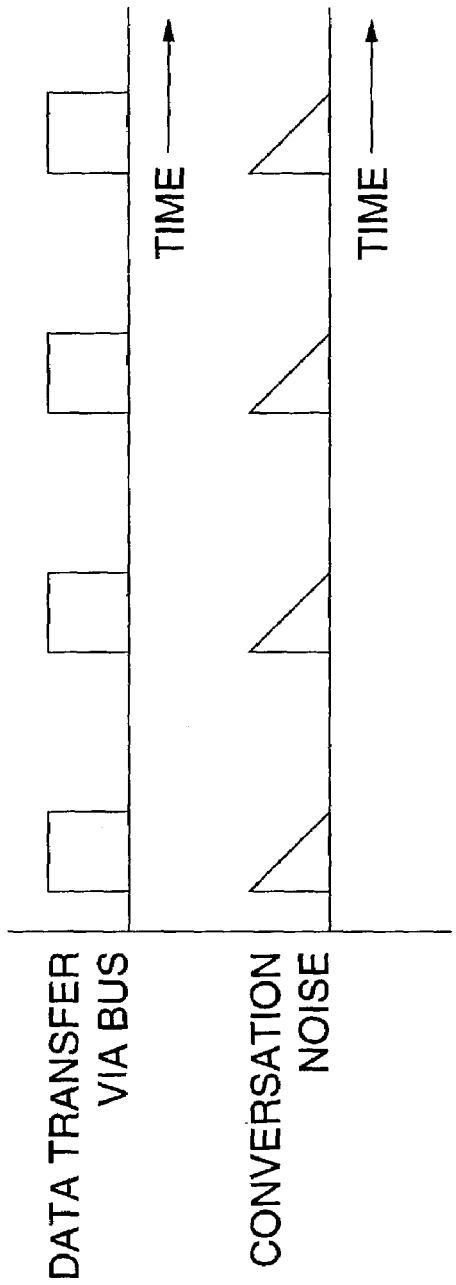
Figure 6B:
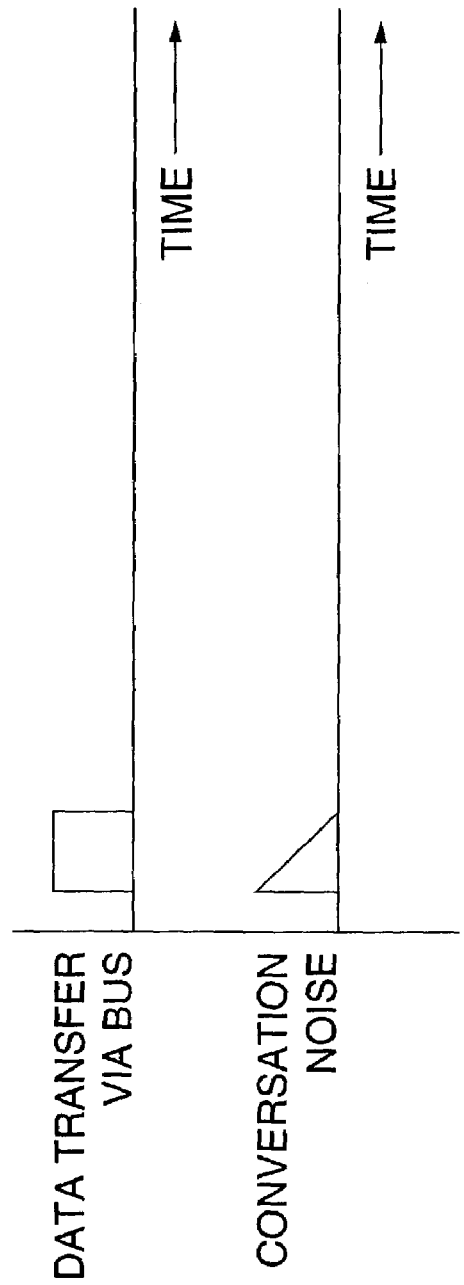

FIGS. 6A and 6B are timing charts showing the relationship between data transfer via the system bus 215 and a noise occurring during conversation. As shown in FIG. 6A, at the time of data transfer via the system bus 215, while data transfer to the display section 101 is being periodically carried out, a RSSI signal (Received Signal Strength Indicative Signal) having a waveform illustrated in the figure is output outputted from the wireless communication section 211. In synchronism with the waveform of the RSSI signal, a noise occurs in communication data received by the master unit antenna 104. In FIG. 6B, when the data transfer via the system bus 215 is stopped, no noise is generated in the output of the wireless communication section 211. How the noise interferes with the reception is simply shown by the arrow in FIG. 2. The noise is caused by a change in a signal on the system bus 215 due to operations of the CPU 201, the ROM 202, the RAM 203, and the LCD controller 204, and the noise flies to the master unit antenna 104.

In the present embodiment, an example has been given, in which data transfer to the display device of the master unit 100 is stopped during communication between the master unit 100 and the slave unit 110 of the cordless telephone. However, the present invention is not limited to this. For example, it may be configured such that during communication between these two wireless communication apparatuses, the CPU of one of the wireless communication apparatuses stops transfer of data to be displayed on the display device of the wireless communication apparatus. Further, the construction of the one wireless communication apparatuses may be changed to a construction where the recording section 208 and the reading section 207 are removed from the master unit 100 shown in FIG. 2.

The present invention is not limited to the construction of the above described embodiment and is applicable to any other construction insofar as it is possible to achieve the functions described in the appended claims or the functions provided by the construction of the above described embodiment.

For example, although in the above described embodiment, only the transfer of display data is stopped, alternatively, the transfer of various other kinds of data that can cause noise during phone conversation may be stopped.

Further, although in the above described embodiment, the present invention is applied to a facsimile machine equipped with a cordless telephone, the present invention is not limited to this, but may be applied to a cordless telephone itself or to a cordless automatic answering telephone having an automatic answering function. As a further alternative, the present invention may be applied to any other type of wireless communication apparatus insofar as it has a display device.

Furthermore, it is to be understood that the object of the present invention may also be accomplished by supplying a system or an apparatus such as the master unit 100 with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, in addition to a ROM as used in the above described embodiment. Alternatively, the program code may be downloaded via a network.

Moreover, it also goes without saying that the functions of the embodiments described above may be realized not necessarily by causing the computer to read and execute the program code, but alternatively by causing an operating (OS) system running on the computer to perform part or all of the actual processing based on instructions in the program code.

What is claimed is:

1. A master unit constructing a cordless telephone in association with a slave unit, the master unit and the slave unit transmitting and receiving a speech signal therebetween using a radio wave, the master unit comprising:
   a display device having a display screen;
   a storage device that stores data to be displayed on the display screen of;
   a transfer device that transfers the stored data;
   a display control device that comprises a memory unit accumulating the transferred data, and that periodically transfers the data accumulated in the memory unit to the display device via a dedicated path to update data displayed on the display screen; and
   a control device that stops the data transfer to said display control device, in response to start of conversation using the slave unit through a wireless communication between the master unit and the slave unit,
   wherein said display control device transfers the data accumulated in the memory unit to the display screen via the dedicated path during the conversation using the slave unit to thereby cause the display screen to continue displaying the data.

2. A master unit according to claim 1, wherein said control device is responsive to start of conversation using the slave unit, for stopping the data transfer by said transfer device upon lapse of a predetermined delay time after the data transfer by said transfer device.

3. A master unit according to claim 1,
   wherein said control device is responsive to start of conversion using the slave unit, for updating data displayed on the display screen such that the display screen is switched from a display showing that said slave unit is receiving an incoming call to a display showing that said slave unit is busy, and for causing said transfer device to transfer, to said display control device, the data relating to the display showing that the slave unit is busy, and then causing said transfer device to stop the data transfer, and
   wherein said control device is responsive to stop of the conversion using said slave unit being ended, for resuming the data transfer to said display control device.

4. A method of controlling display operation of a master unit constructing a cordless telephone in association with a slave unit, the master unit and the slave unit transmitting and receiving a speech signal therebetween using a radio wave, the method comprising:
   a storage step of storing data to be displayed on a display screen of the master unit;
   a transfer step of transferring the stored data;
   an update step of accumulating the transferred data in a memory unit, and periodically transferring the data accumulated in the memory unit via a dedicated path to update data displayed on the display screen; and
   a control step of stopping the data transfer, in response to start of conversation using the slave unit through a wireless communication between the master unit and the slave unit,
   wherein said control step comprises stopping transfer of various types of data including the data to be displayed, in response to start of conversation using the slave unit to thereby cause the display screen to continue displaying the data.

5. A display operation control method according to claim 4, wherein said control step comprises stopping the data transfer in said transfer step upon lapse of a predetermined delay time after the data transfer by said transfer device, in response to start of conversation using the slave unit.

6. A storage medium storing a program having a computer-readable program code that implements a display operation control method according to claim 5.

7. A display operation control method according to claim 4,
   wherein said control step comprises, in response to start of conversion using the slave unit, updating data displayed on the display screen such that the display screen is switched from a display showing that said slave unit is receiving an incoming call to a display showing that said slave unit is busy, and starting transfer, to said display control device, of the data relating to the display showing that the slave unit is busy, and then stopping the data transfer, and
   wherein said control step comprises resuming the data transfer, in response to stop of the conversion using said slave unit being ended.

8. A storage medium storing a program having a computer-readable program code that implements a display operation control method according to claim 7.

9. A storage medium storing a program having a computer-readable program code that implements a display operation control method according to claim 4.

10. A master unit constructing a wireless communication apparatus in association with a slave unit, the master unit and the slave unit transmitting and receiving a speech signal therebetween using a radio wave, the wireless communication apparatus having a display device having a display screen, the master unit comprising:

an expanding device that expands data to be displayed on the display screen of the display device;

a transfer device that transfers the expanded data;

a display control device that comprises a memory unit accumulating the transferred data, and that periodically transfers the data accumulated in the memory unit via a dedicated path to update data displayed on the display screen;

a monitoring device that monitors a wireless communication state of the slave unit; and a stopping device that stops the data transfer to said display control device, wherein when the slave unit is in the wireless communication state, said stopping device stops the data transfer to said display control device, and said display control device transfers the data accumulated in the memory unit to the display screen via the dedicated path during the conversation using the slave unit to thereby cause the display screen to continue displaying the data.

11. A master unit constructing a wireless communication apparatus, according to claim 10, wherein said expanding device expands the data to be displayed on the display screen based on state information indicative of the wireless communication state of the slave unit monitored by said monitoring device, and wherein when the slave unit is in the wireless communication state, said display control device causes said display device to carry out displaying based on the state information which has been updated, and thereafter said stopping device stops the data transfer to said display control device.

12. A master unit constructing a wireless communication apparatus, according to claim 10, wherein the wireless communication apparatus is a cordless telephone comprising a master unit, and at least one slave unit, the master unit and the slave unit transmitting and receiving the speech signal therebetween using the radio wave.

13. A method of controlling display operation of a master unit constructing a wireless communication apparatus in association with a slave unit, the master unit and the slave unit transmitting and receiving a speech signal therebetween using a radio wave, the method comprising:

an expanding step of expanding data to be displayed on a display screen of a display device in the master unit;

a transfer step of transferring the expanded data;

a display control step of accumulating the transferred data in a memory unit, and periodically transferring the data accumulated in the memory unit via a dedicated path to update data displayed on the display screen;

a monitoring step of monitoring a wireless communication state of the slave unit; and a stopping step of stopping the data transfer to said display control device, wherein when the slave unit is in the wireless communication state, said stopping step comprises stopping the data transfer to said display control device, and said display control step comprises transferring the data accumulated in the memory unit to the display screen via the dedicated path during the conversation using the slave unit to thereby cause the display screen to continue displaying the data.

14. A method of controlling display operation of a master unit constructing a wireless communication apparatus, according to claim 13, wherein said expanding step comprises expanding the data to be displayed on the display screen based on state information indicative of the wireless communication state of the slave unit monitored in said monitoring step, and wherein when the slave unit is in the wireless communication state, said display control step comprises causing said display device to carry out displaying based on the state information which has been updated, and thereafter said stopping step comprises stopping the data transfer to said display control device.

15. A storage medium storing a program having a computer-readable program code that implements a display operation control method according to claim 14.

16. A method of controlling display operation of a master unit constructing a wireless communication apparatus according to claim 13, wherein the wireless communication apparatus is a cordless telephone comprising a master unit, and at least one slave unit, the master unit and the slave unit transmitting and receiving the speech signal therebetween using the radio wave.

17. A storage medium storing a program having a computer-readable program code that implements a display operation control method according to claim 16.

18. A storage medium storing a program having a computer-readable program code that implements a display operation control method according to claim 13.

* * * * *